United States Patent [19]

Duncan

[11] 4,412,129

[45] Oct. 25, 1983

[54] ADJUSTABLE PHOTOELECTRIC DETECTOR HEAD FOR SOLID STATE LIMIT SWITCH

[75] Inventor: Eugene F. Duncan, Milwaukee, Wis.

[73] Assignee: Eaton Corporation, Cleveland, Ohio

[21] Appl. No.: 249,764

[22] Filed: Apr. 1, 1981

[51] Int. Cl.³ .............................................. H01J 5/02
[52] U.S. Cl. ..................... 250/239; 250/221
[58] Field of Search ............... 250/221, 222 R, 239; 356/1, 4

[56] References Cited

U.S. PATENT DOCUMENTS

| | | | |
|---|---|---|---|
| 2,481,034 | 9/1949 | Neufeld | 356/1 |
| 3,524,068 | 8/1970 | Zorn | 250/239 |
| 3,793,492 | 2/1973 | Duncan et al. | 200/47 |
| 3,819,888 | 6/1974 | Duncan | 200/47 |
| 3,842,258 | 10/1974 | Shaw | 250/239 |
| 3,882,290 | 5/1975 | Duncan | 200/47 |
| 3,983,343 | 9/1976 | Duncan | 200/47 |
| 4,021,665 | 5/1977 | Haas et al. | 250/239 |
| 4,051,365 | 9/1977 | Fukuyama et al. | 250/222 R |
| 4,199,694 | 4/1980 | van Zeeland | 307/252 J |
| 4,207,464 | 6/1980 | Fukuyama et al. | 250/239 |
| 4,217,492 | 8/1980 | Fayfield | 250/239 |
| 4,282,430 | 8/1981 | Hatten et al. | 250/239 |
| 4,335,316 | 6/1982 | Glanz et al. | 250/221 |

OTHER PUBLICATIONS

"Opcon Catalog" 1975, pp. 16, 17 and 47.
"Omron Catalog" No. E02-E3-2, pp. 2-5, 1979.
"Cutler-Hammer Technical Information Publication" No. E51, May 1979, pp. 1-6.

Primary Examiner—David C. Nelms
Attorney, Agent, or Firm—C. H. Grace; M. L. Union

[57] ABSTRACT

A diffuse reflective photoelectric detector head (2) for a solid state limit switch (4) having a photoreceiver with a fixed field of view (FV) and a light source (20) pivotally adjustable to cause its light beam (LB) to intersect the field of view (FV) at varying distances from the detector head, the adjustment being indicated by a mechanical indicator (26f). The head is mountable on a limit switch enclosure (8) in any of four major axis positions, with electrical connections (22a-50a, b, c) for the head being made at the junction of head (2) and enclosure (8).

12 Claims, 11 Drawing Figures

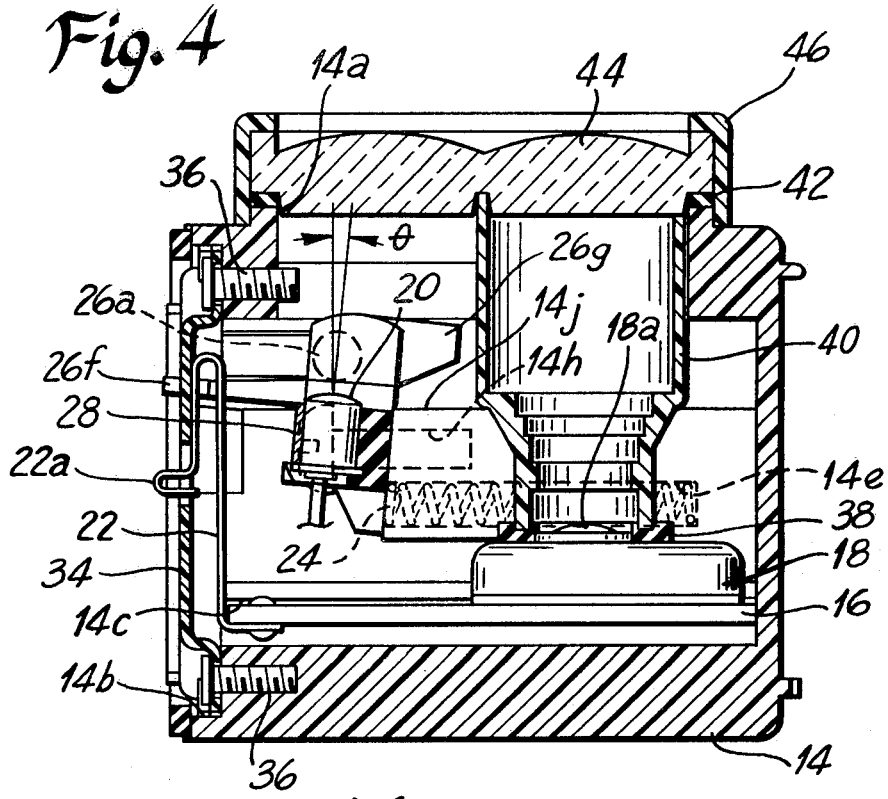
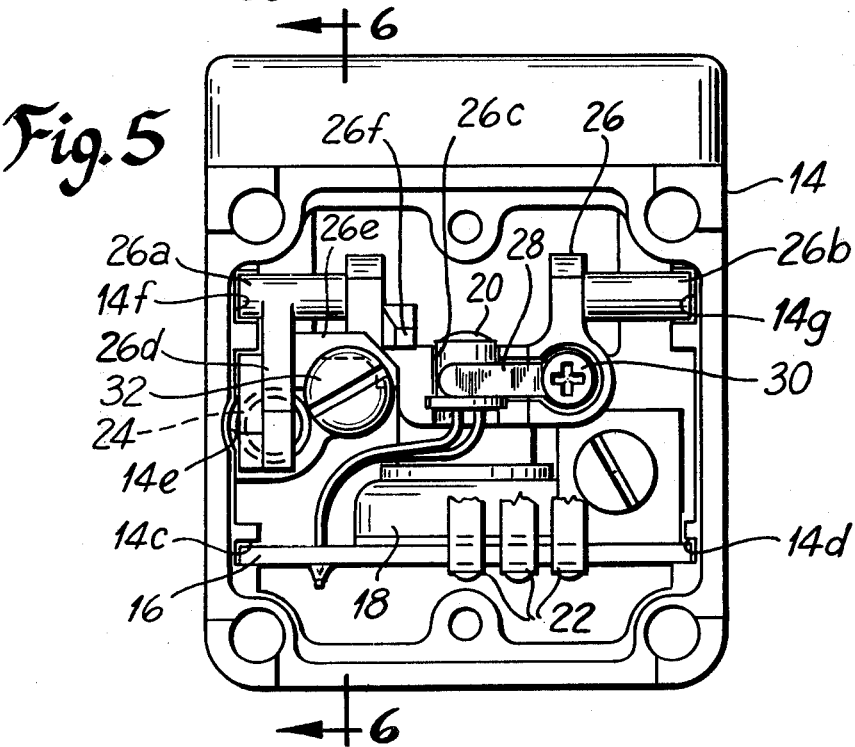

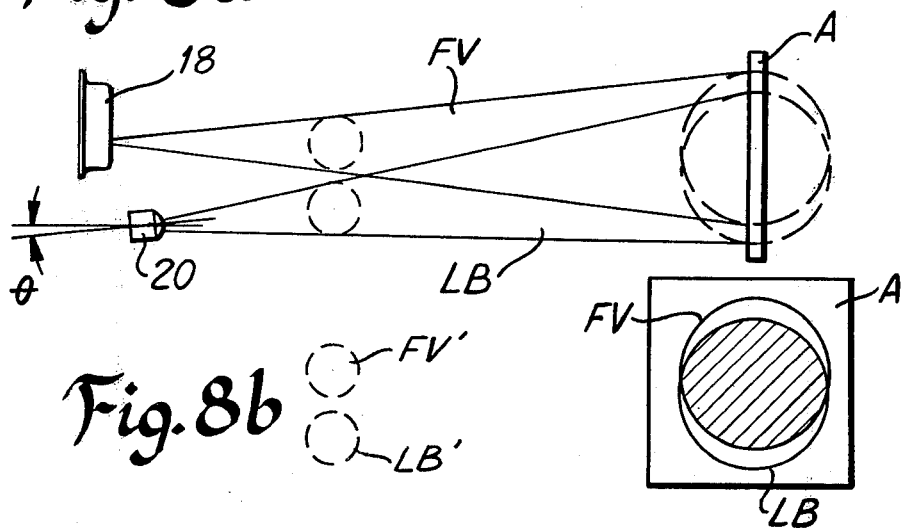
Fig. 8a
Fig. 8b
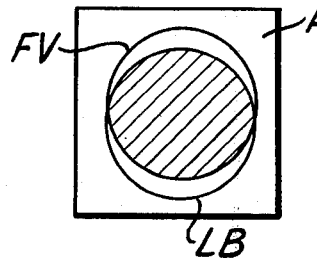
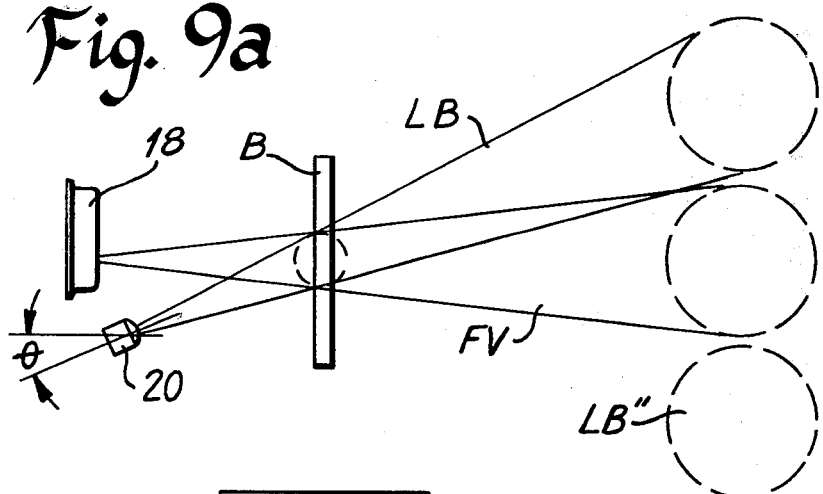
Fig. 9a
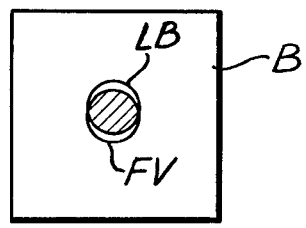
Fig. 9b

ADJUSTABLE PHOTOELECTRIC DETECTOR HEAD FOR SOLID STATE LIMIT SWITCH

BACKGROUND OF THE INVENTION

This invention relates to photoelectric switches used to detect the presence or absence of an object. More particularly the invention relates to diffuse reflective type photoelectric switches wherein the light source and the detector are on the same side of the object. Specifically the invention relates to switches of the aforementioned type which are suited for use in an industrial environment of atmospheric contamination.

It is desirable that such switches be adjustable to provide a strong light signal to maintain good operational reliability under environmental contamination, but to preclude nuisance signals from background surfaces caused by the strong light signal. A preferred method of adjustment is to vary the angle of convergence between the source beam and the detector beam wherein the two beams intersect at the surface of the object to be detected. Such adjustment should be simple, readily accessible yet protected from unintentional adjustment and from the environment, and should preferably include an indication of the adjustment.

SUMMARY OF THE INVENTION

The present invention provides a photoelectric detector for generating input signals to a solid state limit switch comprising a housing having a window in one side thereof, photoelectric detector means within said housing comprising a photoreceiver and a light source, the photoreceiver being fixedly mounted within the housing and having a field of view directed through the window, the light source being pivotally mounted in the housing and directed to emit a light beam through the window to intersect the field of view outside the housing, and adjustment means operable to pivot the light source to change the angle of convergence of the light beam with the field of view of the photoreceiver to thereby vary the distance from the housing at which the light beam intersects the field of view.

It is an object of this invention to provide a photoelectric detector head for a solid state limit switch which is adjustable to provide a strong operating signal at a range of detection distances.

It is a further object of this invention to provide a photoelectric detector head of the foregoing character which has an indication of the adjustment of the head.

It is a further object of this invention to provide a photoelectric detector head of the foregoing character which is enclosed to seal out atmospheric contaminants and to protect the adjustment and indication means.

The foregoing and other features and advantages of my invention will become apparent in the following description and claims when read in conjunction with the drawings.

BRIEF DESCRIPTION OF THE DRAWINGS

FIG. 4 is a cross-sectional view taken along line 4—4 of FIG. 2;

FIG. 5 is a plan view of the underside of the detector head similar to FIG. 2, but having a cover and a gasket for the head removed;

FIG. 8a is a schematic view of the light beam and field of view for one setting of the detector head;

FIG. 8b is a schematic representation of the detected signal of FIG. 8b;

FIG. 9a is a schematic view of the light beam and field of view for another setting of the detector head; and FIG. 9b is a schematic representation of the detected signal of FIG. 9b.

DESCRIPTION OF THE PREFERRED EMBODIMENT

Figure 1:
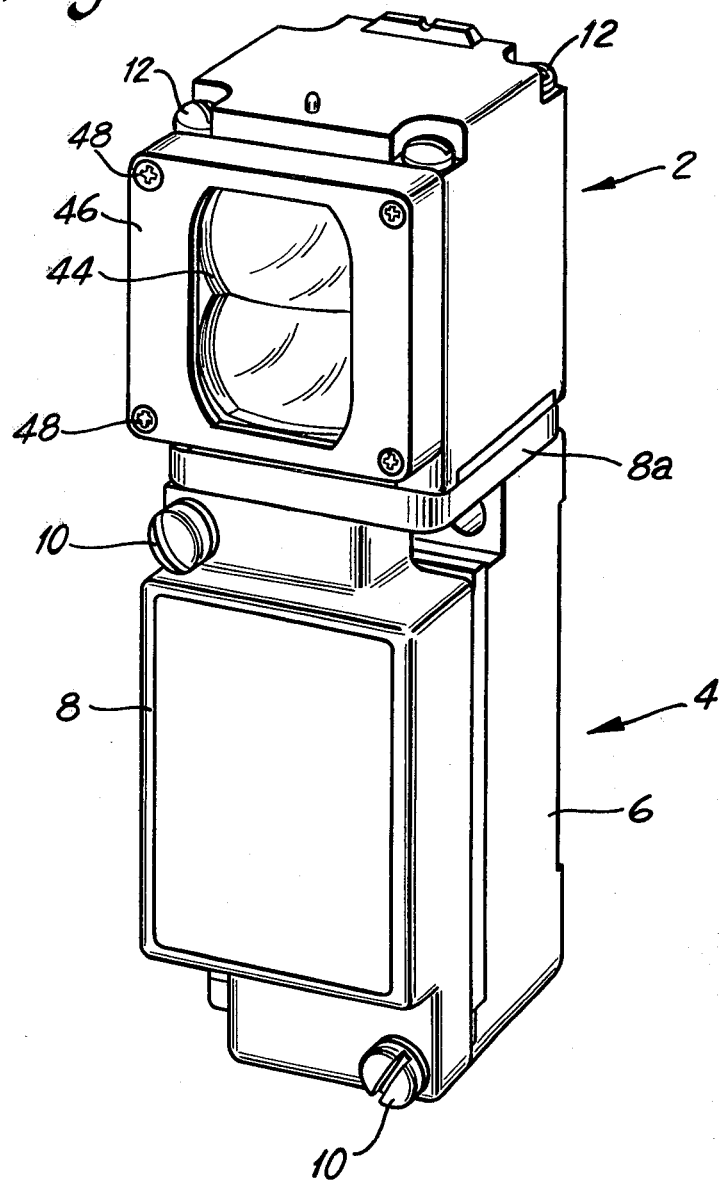
FIG. 1 is a perspective view of the adjustable photoelectric detector head of this invention mounted upon an oiltight enclosure of a solid state limit switch.
Figure 2:
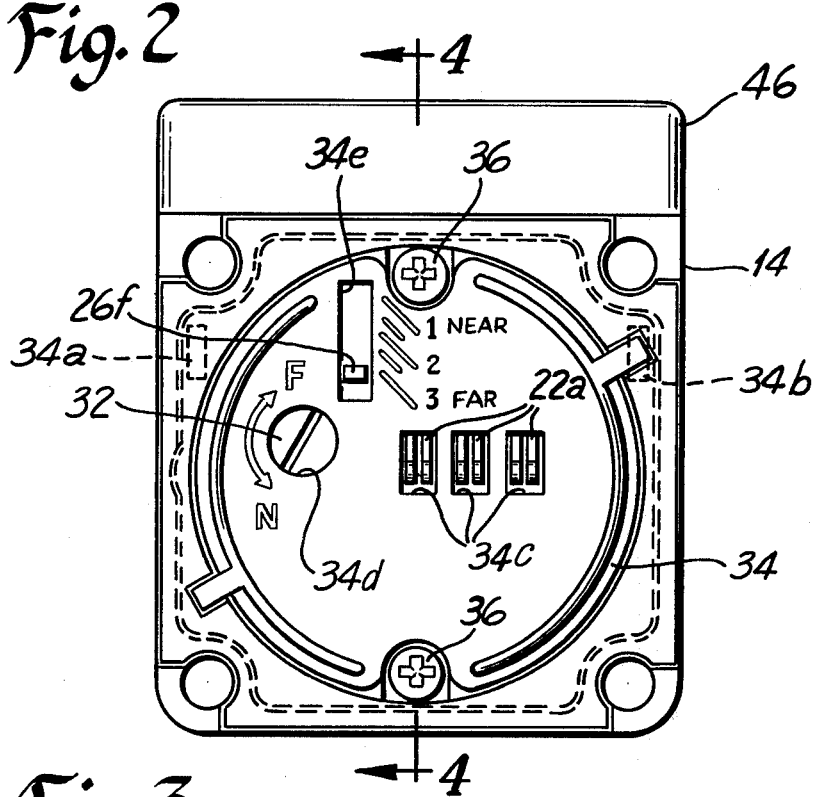
FIG. 2 is a plan view of the underside of the photoelectric detector head of this invention when removed from the limit switch enclosure.
Figure 3:
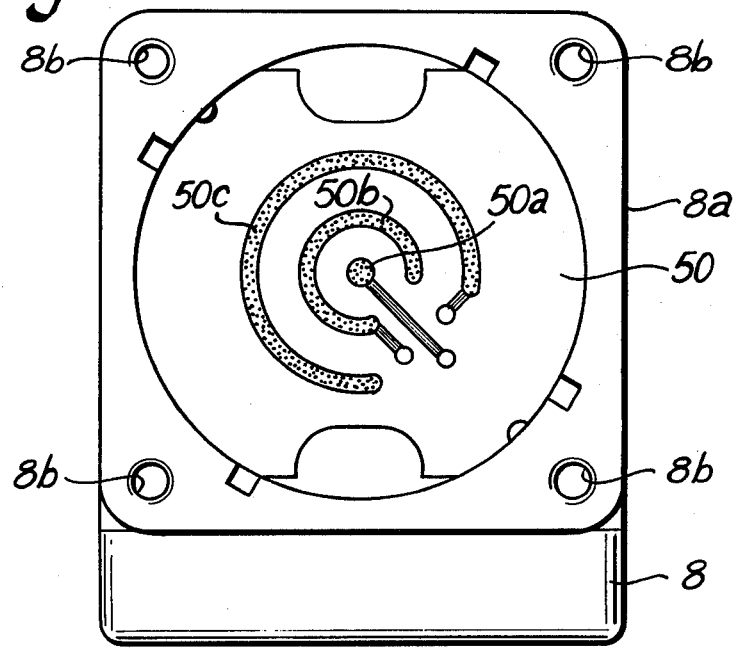
FIG. 3 is a plan view of the exposed upper end of the limit switch enclosure with the photoelectric detector head removed therefrom.

FIG. 1 shows the photoelectric detector head 2 of this invention assembled to a solid state limit switch 4, the enclosure of which is like those described in U.S. Pat. Nos. 3,983,343; 3,882,290; 3,819,888 and 3,793,492. Limit switch 4 includes a base receptacle 6 which may be firmly attached and hard-wired to a machine or other apparatus. A cover or body unit 8 is secured to the receptacle 6 by a pair of screws 10. The body unit 8 houses a solid state switch such as that disclosed in U.S. Pat. No. 4,199,694. Cooperating plug-in terminals in the body unit 8 and receptacle 6 connect the switch to the source and apparatus control wires connected to the receptacle 6. Body unit 8 also includes a mounting flange 8a for the detector head 2, the flange 8a being provided with four tapped openings 8b (FIG. 3) for receiving detector head mounting screws 12 which pass through cooperating opening in the head 2. It will be noted that the openings 8b are arranged in a square pattern to permit the mounting of head 2 on flange 8a in any of four major axis positions. The disclosures of the aforementioned patents are hereby incorporated in this application by reference.

Detector head 2 comprises a hollow molded case 14 having an opening 14a in one side wall and a bottom opening 14b. A pair of grooves 14c and 14d, open to the bottom opening 14b, are formed in opposed interior sidewalls of case 14 near another side thereof to serve as retainers for the edges of a printed circuit board assembly 16. The latter assembly includes a hybrid integrated circuit 18, a light emitting diode, or LED, 20 and three contact springs 22. Other components incidental to the circuitry but not critical to an understanding of the invention are also mounted on the printed circuit board, but are not shown on the drawing for the sake of clarity. As seen in FIG. 4, the contact springs 22 are mechanically fastened to printed circuit board 16 by riveting or the like and are formed over the edge of the board adjacent bottom opening 14b to project across opening 14b. The free ends of contact springs 22 are formed with a first reflex bend to extend back toward the center of the opening 14b and then terminate in downwardly or outwardly formed, bifurcated reflex contact portions 22a.

Figure 7:
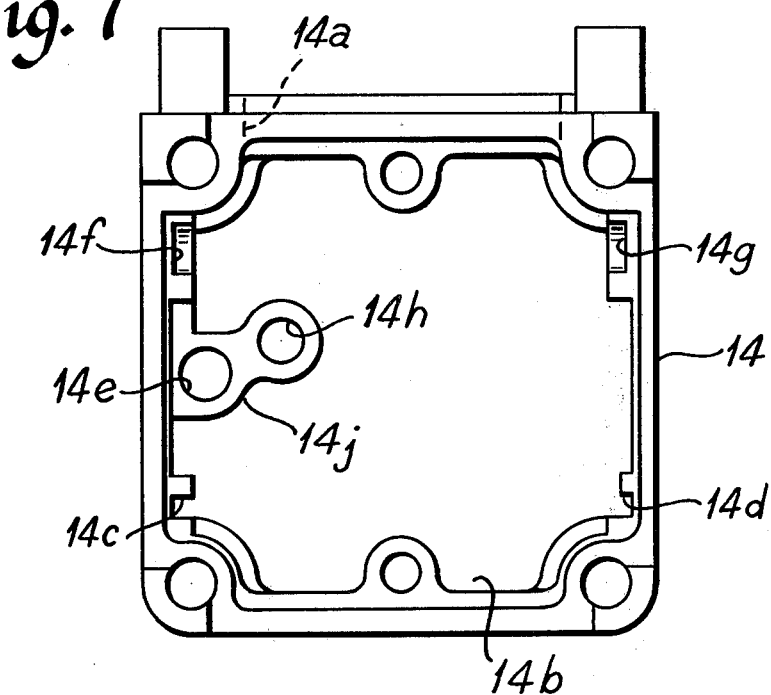
FIG. 7 is a bottom plan view of the empty case for the detector head.

Case 14 has a cylindrical bore 14e which is open to the opening 14b. A helical compression spring 24 is inserted in the bore 14e, the relaxed length of spring 24 being greater than the depth of bore 14e. A cradle member 26 having trunnions 26a, 26b extending in opposite directions along a common axis is inserted into case 14 through opening 14b. Case 14 has a pair of grooves 14f and 14g formed in opposed interior sidewalls as best seen in FIGS. 5 and 7. The grooves 14f and 14g are open to the bottom opening 14b and have closed, semi-circular internal ends to provide bearing surfaces for the trunnions 26a and 26b, respectively, of cradle 26. The central portion of cradle 26 is provided with a semi-circular grooved recess 26c which serves as a locating pocket for LED 20. A clamping strap 28 is secured to cradle 26 by a screw 30 to overlie the LED 20 at the open end of recess 26c to clamp the LED in the recess. Axial displacement of the LED is prevented by an annular ridge on the LED which is cooperatively received within the groove of recess 26c. As seen in FIG. 5, the wire conductor leads of LED 20 are connected electrically and mechanically to the printed circuit board assembly 16. Electrically, the LED is provided with pulsed current through the hybrid integrated circuit 18 to generate a modulated signal.

Figure 6:
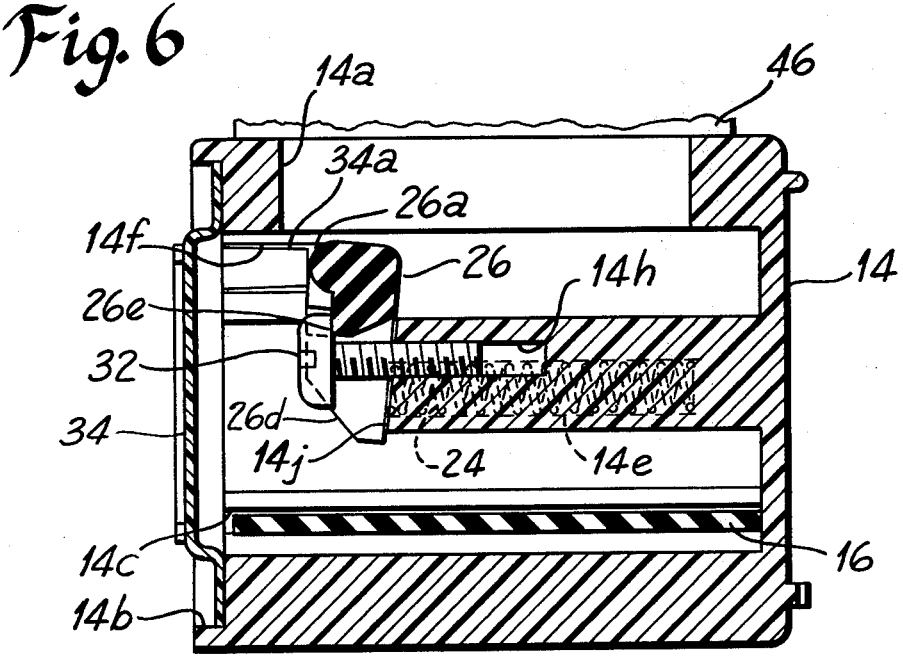
FIG. 6 is a partial cross-sectional view taken along line 6—6 of FIG. 5.

As seen in FIG. 5, the left-hand end of cradle 26 has a projecting arm 26d which overlies the end of spring 24. Between the central LED supporting portion of cradle 26 and the arm 26d is formed a half-octagonal web 26e which is positioned adjacent a recess 14h in case 14. A thread cutting screw 32 is turned into recess 14h whereby the underside of the head of screw 32 engages the web 26e of cradle 26. As viewed in FIG. 5, the engagement of screw 32 with web 26e can be seen to be at one side of the axis of trunnions 26a, 26b. Accordingly, when screw 32 is turned in a clockwise direction to advance inwardly of the case 14, it will pivot cradle 26 about the trunnions 26a, 26b causing arm 26d to compress spring 24. Adjustment of screw 32 in the reverse direction will back the screw outwardly of the housing. Cradle 26 follows screw 32 by virtue of spring 24 acting on arm 26d to pivot cradle 26 in the opposite direction about trunnions 26a, 26b. As seen in FIG. 6, engagement of the lower surface of cradle 26 with the surface of the boss 14j in housing 14 containing recesses 14e and 14h defines a limit of pivotal movement of cradle 26 in one direction. Referring to FIG. 4, cradle 26 may be seen to have a second outwardly extending leg 26g which is engageable with the sidewall of boss 14j to define a limit of pivotal movement of cradle 26 in the other direction.

A cover 34 is secured over the bottom opening 14b by a pair of screws 36. Cover 34 has a pair of projections 34a and 34b which project interiorly of the case 14 when assembled, to lie within the grooves 14f and 14g of case 14. The ends of projections 34a and 34b terminate just short of trunnions 26a and 26b to retain the trunnions in the grooves 14f and 14g, thereby establishing a journaled pivot for the cradle 26. Three aligned rectangular openings 34c are formed in cover 34 to receive the bifurcated reflex contact portions 22a of contact springs 22 therethrough. A circular opening 34d is provided over the adjusting screw 32 to permit screwdriver access therethrough. A rectangular window opening 34e accommodates the outwardly projecting end of an indicator 26f molded integrally with the cradle 26.

The hybrid integrated circuit 18 does not per se form a part of this invention. Insofar as is necessary for an understanding of this invention, the hybrid integrated circuit 18 is a transceiver, providing as mentioned earlier, modulated power to the LED 20 and receives a light signal reflected from the detected object. It includes a photoreceiver device such as a phototransistor which receives the actuating light signal through an opening in a metal case enclosing the circuit package. A lens 18a is secured over the opening by an epoxy or the like. A resilient rubber washer 38 is also fixed to the package case around the lens 18a. A shroud 40 is positioned within case 14 through the opening 14a such that the narrow end of shroud 40 rests upon the rubber washer 38. A gasket 42 and lens 44 are positioned over the opening 14a, the inner surface of the lens 44 engaging and interfitting with the outer surface of shroud 40 to retain the latter in position. A lens cover 46 is then positioned over the lens 44 and attached to the side of case 14 by four screws 48 as seen in FIG. 1 to retain the shroud 40, gasket 42 and lens 44 in place.

As mentioned earlier in the description, the detector head 2 may be positioned upon flange 8a the limit switch body 8 in any of four major axis positions such that the lens 44 of head 2 may be directed to the front, rear or either side of limit switch 4. To achieve electrical connection between the circuitry of head 2 and the circuitry of limit switch 4, the flange portion 8a is provided with a printed circuit disc connector 50 which has a central contact segment 50a and concentric contact rings 50b and 50c. The contacts are connected through the disc to the terminals of the solid state switch. The segment 50a and rings 50b and 50c are engaged individually by the bifurcated reflex contact portions 22a of spring contacts 22 when the head 2 is positioned in any of the four positions aforedescribed. A rubber gasket 52 is positioned between the head 2 and flange 8a to seal the switch against atmospheric contaminants.

The photoelectric detecting limit switch described herein is used to sense the proximity of objects primarily having non-polished or non-glossy surfaces. Light radiated onto the surfaces of such objects is diffused, or reflected, in scattered directions. The switch is mounted at one side of the path of the object, emits a light beam from the LED and receives a portion of the reflected light as the object passes through the light beam to actuate the phototransistor in the detector circuit. The latter has a sensitivity threshold built into the circuit to eliminate false switch operations due to weak signals, and hysteresis which decreases the threshold level when a signal is detected to require the signal to drop below the value at which detection occurred when returning to the opposite output state of the circuit thereby to prevent fluttering of the circuit between high and low conditions. In use, it is desirable to operate the detector circuit from a strong signal for certainty of operation and, more importantly, to compensate for signal attenuation due to contaminants in the switch environment such as dust, dirt, smoke, oil or the like in the air or on the lens of the device.

The adjustment mechanism comprising pivotable cradle 26, spring 24 and screw 32 permits the detector to operate on a strong signal when used to detect objects in paths as near as ½ inch and as far as 6 inches from the detector head as an example. With reference also to FIGS. 8a, 8b, 9a and 9b, the phototransistor of hybrid integrated circuit 18 has a field of view FV which radiates outwardly in a pattern dictated by the lenses 18a and 44. This field of view is fixed inasmuch as the printed circuit assembly 16 is fixed within case 14. An object to be detected will travel in a path which is substantially normal to the detector head and to the field of view in a path that is a known distance from the detector head. The strongest signal will occur when the light beam LB emitted from LED 20 intersects the field of view FV at the surface of the object. With the aid of indicia provided on cover 34 adjacent opening 34d and 34e, the screw 34 may be rotated in the appropriate direction to pivot cradle 26 and LED 20 to change the angle $\theta$ of LED 20 light beam LB to intersect the field of view FV of detector circuit 18 at the known distance of the surface of the object. The angle $\theta$ is referred to as the angle of convergence, defining the angle at which the light beam LB converges with the field of view FV.

In FIG. 8a the angle of convergence $\theta$ is very small to detect an object A at a far distance from the head, but being within the range limits for the head. The object A is positioned fully within the field of view FV of the detector and for purposes of description, light beam LB is made to strike the surface of object A just below the point of true intersection with the field of view FV. FIG. 8b shows the pattern of the field of view FV and light beam LB on object A in FIG. 8a. It can be seen that the upper segment of the field of view FV is not illuminated by light beam LB and that the lower segment of light beam LB falls outside the field of view FV. However, the cross-hatched central area represents the area of strong signal received by the phototransistor of detector circuit 18 and it can be seen that a major portion of the emitted light from LED 20 falls within this area. An optimum adjustment of the detector head screw 32 would cause the two circles to exactly coincide, thereby providing the maximum strength signal. The left-hand portion of FIG. 8b depicts the field of view FV' and light beam LB' patterns for any object that might pass the detector head in a near path. It can be seen that the circles lie completely outside each other and therefore no signal is received.

If the detector head 2 is required to sense objects traveling in a path close to it, such as object B in FIG. 9a, the screw 32 is rotated counterclockwise to back it outwardly of case 14 and permit spring 24 to pivot cradle 26 to increase the angle of convergence $\theta$. Thus, the light beam LB intersects the field of view much nearer the detector head, and ideally at the surface of object B. For purposes of illustration, the point of intersection is depicted as being just above the true intersection to show in FIG. 9b an area of the light beam LB falling above the field of view FV, and an area of the latter receiving no illumination from the light beam. The cross-hatched central area represents the strong signal wherein a major portion of the emitted light falls within this area.

A significant feature of the adjustability of the detector head 2 is that it eliminates background nuisance detection which commonly occurs in devices having high sensitivity and a strong signal emitted from the light source. In the right-hand portion of FIG. 9b the field of view FV'' and light beam LB'' patterns are shown as falling completely outside each other at a distance beyond the point of intersection. Accordingly, the phototransistor of detector circuit 18 receives no signal, even if an object were to pass through the field of view at that distance.

While the apparatus hereinbefore described is effectively adapted to fulfill the objects stated, it is to be understood that the invention is not intended to be confined to the particular preferred embodiment of photoelectric detector head for a solid state limit switch disclosed, inasmuch as it is susceptible of various modifications without departing from the scope of the appended claims.

We claim:

1. A photoelectric detector head for a solid state limit switch, said detector head comprising, in combination:
a housing having a window in one side thereof;
photoelectric detector means within said housing comprising a photoreceiver and a light source;
said photoreceiver being fixedly mounted within said housing and having a field of view directed through said window;
said light source being pivotally mounted within said housing and directed to emit a light beam through said window to intersect said field of view outside said housing; and
adjustment means operable to pivot said light source to change the angle of convergence of said light beam with said field of view of said photoreceiver to thereby vary the distance from said housing at which said light beam intersects said field of view;
said light source comprises a cradle journaled for rotation in said housing and a light emitting device fixedly mounted to said cradle;
an indicator projecting from said cradle toward a side of said housing and providing an indication of the distance from said housing at which said light beam intersects said field of view;
window means in said housing in which said indicator may be viewed; and
indicia on said housing adjacent said window means;
said indicator means and said indicia cooperatively providing an indication of the distance from the housing at which said light beam intersects said field of view; and wherein
said adjustment means comprises a screw threadably received in said housing and having a portion in cooperating engagement with said cradle to pivotably move said cradle.

2. The photoelectric detector head according to claim 1 wherein:
said screw engages said cradle to move said cradle in a first pivotal direction; and
said adjustment means further comprises biasing means engaging said cradle to bias said cradle in an opposite pivotal direction.

3. The photoelectric detector head according to claim 2 wherein:
said biasing means comprises a spring member received in said housing and bearing against said cradle at one side of the pivotal support axis thereof; and
said screw comprises a threaded shank portion and an enlarged head portion, said shank portion being threadably received in said housing, and a portion of said enlarged head portion overlying a portion of said cradle at said one side of the pivotal support axis thereof to limit pivotal movement of said cradle by said spring.

4. The photoelectric detector head according to claim 3 wherein:
rotational movement of said screw in a first direction pivots said cradle in said first pivotal direction against the bias of said spring; and
rotation of said screw in a second direction moves said screw head away from said cradle and said spring moves said cradle to follow said screw head, thereby to move said cradle in said opposite direction.

5. The photoelectric detector head according to claim 2 or 4 wherein:
movement of said cradle in said first pivotal direction decreases said angle of convergence to thereby increase the distance from said housing at which said light beam intersects said field of view.

6. The photoelectric detector head according to claim 1 wherein said light emitting device comprises a light emitting diode.

7. The photoelectric detector head according to claim 1 wherein said indicator means projects toward a second housing side which is adjacent to said one side of said housing, said window means in said housing comprises an opening in said second housing side which a free end of said indicator means is received.

8. The photoelectric detector head according to claim 7 wherein said detector head is mounted to an enclosure for said solid state limit switch, said second side of said detector head overlying and closing off an open end of said limit switch enclosure to form a fluid-tight assembly.

9. The photoelectric detector head according to claim 8 wherein said adjustment screw is accessible at said second side of said housing, and said adjustment screw and said indicator are non-accessible upon assembly of said detector head to said limit switch enclosure.

10. The photoelectric detector head according to claim 1 wherein:
said solid state limit switch comprises an enclosure having an open end containing first electrical connector means;
said housing has openings in a second side thereof adjacent said one side;
said photoelectric detector means further comprises second electrical connector means extending through said openings in said second side; and
said photoelectric detector head is mounted to said limit switch enclosure such that said second side overlies said open end and said first and second electrical connector means are mutually electrically engaged by the mounting of said detector head to said limit switch enclosure.

11. The photoelectric detector head according to claim 10 wherein:
said first electrical connector means comprises concentric circular segments positioned across said open end of said enclosure; and
said second electrical connector means comprise individual, radially positioned fingers individually engageable with respective ones of said segments,
whereby said detector head may be positioned on said enclosure to have said one side face in any of four right-angle directions.

12. The photoelectric detector head according to claim 11 wherein:
a lens is positioned over said window and secured by means providing a fluid-tight seal with said housing; and
sealing means are provided at the junction of said open end of said enclosure and said second side of said housing to provide a fluid-tight seal between said housing and said enclosure, whereby to provide a fluid-tight photoelectric limit switch assembly.

* * * * *